(12) United States Patent
Faber et al.

(10) Patent No.: US 8,900,694 B2
(45) Date of Patent: Dec. 2, 2014

(54) LAYER OR COATING AND A COMPOSITION FOR THE PRODUCTION THEREOF

(75) Inventors: Stefan Faber, Saarbrücken (DE); Ralph Nonninger, Saarbrücken (DE)

(73) Assignee: ItN Nanovation AG (DE)

( * ) Notice: Subject to any disclaimer, the term of this patent is extended or adjusted under 35 U.S.C. 154(b) by 1818 days.

(21) Appl. No.: 11/992,075

(22) PCT Filed: Sep. 7, 2006

(86) PCT No.: PCT/EP2006/008713
§ 371 (c)(1), (2), (4) Date: Jun. 12, 2008

(87) PCT Pub. No.: WO2007/031224
PCT Pub. Date: Mar. 22, 2007

(65) Prior Publication Data
US 2009/0263638 A1 Oct. 22, 2009

(30) Foreign Application Priority Data

Sep. 14, 2005 (DE) .......... 10 2005 045 666

(51) Int. Cl.
| | | |
|---|---|---|
| B32B 7/02 | (2006.01) |
| C04B 41/87 | (2006.01) |
| B22C 3/00 | (2006.01) |
| B82Y 30/00 | (2011.01) |
| C04B 35/117 | (2006.01) |
| C04B 35/119 | (2006.01) |
| C04B 35/478 | (2006.01) |
| C04B 35/634 | (2006.01) |
| C04B 41/00 | (2006.01) |
| C04B 41/50 | (2006.01) |
| C04B 111/00 | (2006.01) |

(52) U.S. Cl.
CPC . *C04B 41/87* (2013.01); *B22C 3/00* (2013.01); *B82Y 30/00* (2013.01); *C04B 35/117* (2013.01); *C04B 35/119* (2013.01); *C04B 35/478* (2013.01); *C04B 35/63424* (2013.01); *C04B 41/009* (2013.01); *C04B 41/5041* (2013.01); *C04B 41/5066* (2013.01); *C04B 2111/0087* (2013.01); *C04B 2235/3232* (2013.01); *C04B 2235/386* (2013.01); *C04B 2235/3873* (2013.01); *C04B 2235/483* (2013.01); *C04B 2235/5436* (2013.01); *C04B 2235/5454* (2013.01)
USPC .......... 428/220; 428/212

(58) Field of Classification Search
USPC .............. 428/212, 220
See application file for complete search history.

(56) References Cited

U.S. PATENT DOCUMENTS

| | | | | |
|---|---|---|---|---|
| 4,552,800 | A | * | 11/1985 | Blasch et al. ......... 428/212 |
| 4,559,277 | A | * | 12/1985 | Ito ...................... 428/627 |
| 4,740,246 | A | | 4/1988 | Feagin |
| 4,818,635 | A | | 4/1989 | Ekström et al. |
| 4,956,319 | A | * | 9/1990 | Dwivedi et al. ........ 501/127 |
| 5,076,339 | A | | 12/1991 | Smith |
| 5,187,008 | A | * | 2/1993 | Haller et al. ......... 428/378 |
| 5,340,658 | A | * | 8/1994 | Komatsu et al. ...... 428/558 |
| 5,549,725 | A | * | 8/1996 | Kasai et al. ........... 55/523 |
| 5,616,527 | A | * | 4/1997 | Kita et al. ............. 501/97.2 |
| 5,846,276 | A | | 12/1998 | Nagai et al. |
| 6,420,477 | B1 | * | 7/2002 | Hamamura et al. .... 524/589 |
| 7,378,210 | B2 | * | 5/2008 | Hiraoka et al. ....... 430/109.4 |
| 2004/0029706 | A1 | * | 2/2004 | Barrera et al. ........ 501/99 |
| 2005/0041281 | A1 | * | 2/2005 | Aoyama et al. ....... 359/356 |
| 2007/0054057 | A1 | | 3/2007 | Matji et al. |

FOREIGN PATENT DOCUMENTS

| | | |
|---|---|---|
| AT | 394 039 B | 1/1992 |
| CN | 85101384 A | 5/1987 |
| DE | 38 15 239 A1 | 11/1989 |
| DE | 42 25 922 A1 | 2/1994 |
| DE | 690 05 163 T2 | 4/1994 |
| DE | 196 26 375 A1 | 1/1997 |
| DE | 103 26 769 B3 | 12/2004 |
| DE | 20 2004 014 151 U1 | 3/2005 |
| EP | 0 663 020 B1 | 8/1997 |
| EP | 1 113 092 B1 | 11/2004 |
| EP | 1 508 762 A2 | 2/2005 |
| EP | 1 070 096 B1 | 7/2006 |
| JP | 51-009717 B | 3/1976 |
| JP | 7-187825 A | 7/1995 |
| WO | 99/41030 | 8/1999 |

OTHER PUBLICATIONS

Duan, R-G. et al., "Processing and Microstructure of High-Pressure Consolidated Ceramic Nanocomposites," *Scripta Materialia*, 2004, vol. 51, pp. 1135-1139.

Ananthakumar, S. et al., "Microstructural Features and Mechanical Properties," *British Ceramic Transactions*, 2002, vol. 101, No. 1, pp. 38-43.

Dong-Sik, B. et al., "Fabrication and Microstructure of Al2O3-TiO2 Composite Membranes with Ultrafine Pores," *Ceramics International*, 1998, vol. 24, No. 1, pp. 25-30 (English translation of Abstract only).

Innocenzi, P. et al., "Low Temperature Synthesis of $Mg_x Al_{2(1-x)}Ti_{(1+x)}O_5$ Films by Sol-Gel Processing," *Journal of the European Ceramic Society*, 2005. vol. 25, pp. 3587-3591.

Ananthakumar, S. et al., "Extrusion Characteristics of Alumina-Aluminum Titanate Composite Using Boehmite as a Reactive Binder," *Journal of the European Ceramic Society*, 2001, vol. 21, pp. 71-78 (BNS pp. 1-8).

* cited by examiner

*Primary Examiner* — Aaron Austin
*Assistant Examiner* — Lawrence Ferguson
(74) *Attorney, Agent, or Firm* — DLA Piper LLP (US)

(57) ABSTRACT

A composition for producing a layer or a coating, especially a mold release layer, includes aluminum titanate and/or silicon nitride, an oxidic inorganic component and a binder comprising nanoscale particles.

26 Claims, No Drawings

LAYER OR COATING AND A COMPOSITION FOR THE PRODUCTION THEREOF

RELATED APPLICATIONS

This is a §371 of International Application No. PCT/EP2006/008713, with an international filing date of Sep. 7, 2006 (WO 2007/031224 A2, published Mar. 22, 2007), which is based on German Patent Application No. 10 2005 045 666.9, filed Sep. 14, 2005.

TECHNICAL FIELD

This disclosure relates to compositions for producing layers or coatings, especially mold release layers, to processes for producing such compositions, to the layers or coatings produced, and to objects coated with the layers or coatings.

BACKGROUND

In the processing of melts of inorganic materials, especially of metal and glass melts, it is customary to provide the surfaces of tools, aids and especially of molds which come directly into contact with the liquid materials with a release agent. Such a release agent (which is usually referred to as a mold release agent) has the task of preventing the reaction of a melt with the surfaces mentioned. The adhesion of the melt on these surfaces should be very low both in the liquid state and in the solid (cooled) state. For example, a casting can be removed more easily from a mold provided with a mold release layer. A mold release layer reduces the wear on a mold and correspondingly also has a positive effect on its lifetime.

Mold release layers should not adhere on the surfaces of castings and, if they are applied as antiwear sizes, also should not become too firmly bonded to the surfaces of the molds, tools or aids. In addition, a mold release layer should be noncombustible and additionally environmentally compatible, which means especially that no toxic substances should outgas at high temperatures. In general, mold release layers are produced in very homogeneous layer thicknesses by painting on or spraying on a paintable or sprayable composition. Such a composition for producing mold release layers is also referred to as a size.

The prior art discloses both purely organic and inorganic mold release layers. U.S. Pat. No. 5,076,339 describes, for example, an organic mold release layer based on low-melting waxes. Such organic release layers are, however, immediately decomposed thermally on contact with metal or glass melts at a temperature of several hundred degrees. Between a mold provided with the organic release layer and the melt, a gas cushion may form, which can in turn lead to the formation of pores in the casting.

Inorganic mold release layers are generally preferred for this reason in the processing of hot metal or glass melt.

Commercially available inorganic mold release layers are based usually on the following compounds: graphite (C), molybdenum disulfide ($MoS_2$) and boron nitride (BN), the latter especially in its hexagonal form. Mold release layers based on these materials are notable for their exceptionally low wettability by metal melts. They have particularly low wettability with respect to aluminum and magnesium melts and with respect to melts composed of aluminum-magnesium alloys. While, however, graphite is oxidized under air even at temperatures around 500° C., and molybdenum sulfide even at as low as from 400° C., boron nitride is stable under the same conditions up to about 900° C. Accordingly, boron nitride is suitable especially as a constituent of mold release layers for high-temperature use.

However, both mold release layers based on graphite or molybdenum sulfide and those based on boron nitride are generally not very abrasion-resistant. Especially the processing of light metal melts or glass melts (melts in which high flow rates occur) places high mechanical demands which are not met in a lasting manner by the known inorganic mold release layers. The mold release layers known from the prior art are correspondingly worn very rapidly, are generally not intended for repeated use for this reason and have to be replaced regularly.

It could therefore be advantageous to provide a mold release layer which does not have the disadvantages known from the prior art. A mold release layer should be very inert and oxidation-resistant with respect to metal melts. In particular, a mold release layer should have low wettability with respect to metal and glass melts and simultaneously be abrasion-resistant. It should be able to withstand high mechanical stresses which arise, for example, in the course of processing of melts with high flow rates, and are thus suitable for repeated use (even in the case of lasting stress over several days and weeks).

SUMMARY

We provide a composition for producing a layer or a coating, including aluminum titanate and/or silicon nitride, an oxidic inorganic component and a binder including nanoscale particles.

We also provide the composition, including A; particles of aluminum titanate and/or of silicon nitride with a mean particle size of >500 nm, B: inorganic oxide particles with a mean particle size between 100 nm and 10 µm, C: a binder which includes nanoscale particles having a mean particle size of <50 nm, especially less than <25 nm, and D: a suspension medium.

We further provide the composition, including A: particles of aluminum titanate and/or of silicon nitride with a mean particle size of >1 µm, B: inorganic oxide particles with a mean particle size between 200 nm and 10 µm, especially between 200 nm and 1 µm, C: a binder which includes nanoscale particles having a mean particle size of <50 nm, especially less than <25 nm, and D: a suspension medium.

We further yet provide a layer or coating produced from the composition.

We also further provide a process for producing the composition, including A: particles of aluminum titanate and/or of silicon nitride with a mean particle size of >500 nm, B: inorganic oxide particles with a mean particle size between 100 nm and 10 µm, C: a binder which comprises nanoscale particles having a mean particle size of <50 nm, especially less than <25 nm, and D: a suspension medium, including dispersing component A in water and subsequently mixing the resulting dispersion with the aqueous dispersion/suspensions of component B, component C and any further components.

We still further provide a process for producing the composition, including A: particles of aluminum titanate and/or of silicon nitride with a mean particle size of >1 µm, B: inorganic oxide particles with a mean particle size between 200 nm and 10 µm, especially between 200 nm and 1 µm, C: a binder which comprises nanoscale particles having a mean particle size of <50 nm, especially less than <25 nm, and D: a suspension medium, including dispersing component A in water and subsequently mixing the resulting dispersion with the aqueous dispersion/suspensions of component B, component C and any further components.

DETAILED DESCRIPTION

Our compositions for producing layers or coatings, especially mold release layers, comprise, as component A, aluminum titanate, silicon nitride or a mixture of the two, particular preference being given to aluminum titanate-containing compositions. In addition, the compositions comprise an oxidic inorganic component B (excluding aluminum titanate, which is strictly speaking also an oxide, as a possible constituent of component B) and a binder comprising nanoscale particles as component C and, in a preferred form, a suspension medium as component D.

It has been found that, surprisingly, it is particularly advantageous, especially with regard to the abrasion stability of a layer or coating producible from a composition, that a particular particle size distribution predominates in the composition. In preferred forms, the particles of component A have a mean particle size of >500 nm, especially >1 µm. For the inorganic oxide particles of component B, mean particle sizes between 100 nm and 1 µm, especially between 200 nm and 1 µm, are particularly preferred. In some cases, however, oxide particles with mean sizes in the micron range, especially up to a size of 10 µm, may also be preferred. The nanoscale particles of binder component C are preferably significantly smaller; in particular, they have mean particle sizes of <50 nm, especially <25 nm.

The functioning of a binder comprising such nanoscale particles is described in detail in WO 03/093195, the subject matter of which is incorporated herein by reference. The nanoparticles used in the binder possess very large specific surface areas which are preferably covered with reactive hydroxyl groups. These surface groups are capable of crosslinking even at room temperature with the surface groups of the (typically relatively coarse) particles to be bound. At temperatures above 200° C., preferably above 300° C., owing to the extremely high surface energies of the nanoparticles, mass transfer sets in toward the contact sites of the particles to be bound, which leads to further consolidation.

For the particles of component A, a mean particle size between 1 µm and 25 µm, preferably between 1 µm and 10 µm, especially between 2 µm and 10 µm, is more preferred. In a particularly preferred example, the mean particle size for the particles of component A is approx. 5 µm.

To explain the excellent abrasion stability of a layer or coating producible from a composition, it is currently believed that the particles with the size distribution as defined above can be arranged particularly advantageously with respect to one another in the layer or coating formed. It is believed that smaller particles are intercalated in interstices which remain empty between adjacent coarser particles, so as to give rise to a structure with increased density, whose integrity is in turn ensured by the nanoscale binder (component C), which fixes and reinforces the contact sites between the particles.

The inorganic oxide particles of component B are preferably ceramic particles with a Mohs hardness of >6. Particularly suitable are binary oxide compounds, especially particles of aluminum oxide or titanium dioxide, but mixtures of the two may also be preferred.

The most important criterion in the selection of the particles of the binder component C is their size which, as stated above, should not exceed 50 nm on average. The particles are especially oxidic particles, preferably aluminum oxide, zirconium oxide and/or titanium dioxide particles, or else precursors of these compounds. With regard to favorable wetting properties (in particular with respect to light metal melts), especially mixtures of titanium dioxide particles with aluminum oxide particles or boehmite particles have been found to be particularly suitable. Moreover, it may also be preferred that the binder comprises nanoscale aluminum titanate particles (optionally in addition to non-nanoscale aluminum titanate particles from component A).

In a further preferred form, the binder, as well as the nanoparticles mentioned, may comprise at least one organosilicon constituent from the group comprising alkylpolysiloxane, alkylsilicone resin and phenylsilicone resin. The at least one organosilicon constituent can be used, for example, in the form of aqueous emulsions and contributes to the consolidation and compaction of the layer or coating to be produced.

In addition, it is preferred that the binder comprises at least one glasslike constituent, especially a frit. Frits are understood to mean glass systems in which water-soluble salts (soda, borax and others) and further substances are bound in silicatic form and hence have been substantially converted to a water-insoluble form.

In the production of a layer or coating on a substrate of a composition comprising a glass-like constituent, it can melt and form a gas-tight layer. In particular, layers or coatings which have been produced from such a composition also offer surprisingly efficient protection against corrosion of the substrate. In addition, the glasslike constituent may also function as a binder.

Instead of the glasslike constituent or else in addition to it, a composition may comprise one or more constituents which additionally impart a thermally insulating or heat-barrier action to a layer producible from the composition. Preferred such constituents are especially aluminum silicates and calcium silicates such as wollastonite (for example, commercially available under the names MM80 wollastonite from Carl Jäger, Germany) and xonotlite (for example, commercially available under the names Promaxon® D and T from Promat AG, Switzerland). Mica too, especially micronized mica, is outstandingly suitable. A layer produced from such a composition protects, for example, tools, aids and molds not only from adhesions, but also particularly advantageously from the high thermal stresses which can occur especially on contact with liquid metal melts.

The suspension medium which may be present in the composition is preferably polar. It more preferably comprises water as the main constituent, but it may in principle also comprise further polar components, for example alcohols.

In many cases, it is, however, desirable to dispense with organic constituents in the suspension medium. For instance, in the presence of organic solvents, there is in principle always the risk of fire owing to their low vapor pressure.

Accordingly, the composition, in a preferred form, comprises a suspension medium which is free of nonaqueous liquid constituents.

More preferably, a composition comprises at least one interface-active substance, especially a polyacrylate. The addition of an interface-active substance has been found to be advantageous especially in the cases in which the suspension medium is free of nonaqueous liquid constituents.

It may be preferred that a composition comprises boron nitride as an additional component. It has been found that a proportion of boron nitride has a positive effect on the flexibility, especially the proneness to cracking and the elasticity, of the layer or coating to be produced. This is especially true for layers/coatings based on compositions comprising aluminum titanate or silicon nitride as component A and aluminum oxide as component B.

Similar results were also achieved by an addition of graphite, again especially in combination with aluminum titanate or silicon nitride as component A and aluminum oxide as component B. Accordingly, the composition comprises, in a further preferred form, graphite as an additional component.

However, there are also particularly preferred forms of the compositions in which they are free of boron nitride and/or graphite.

A composition preferably has a solids content between 25% by weight and 60% by weight. The amount of the suspension medium present in the composition is in principle not critical and can be varied according to the use of the composition. In a preferred example, the composition is present in the form of a low-viscosity, especially paintable or sprayable, suspension.

Based on the solids content, component B is present in a composition preferably in a proportion of >40% by weight, especially >50% by weight.

In a further development, a composition, in a preferred form, contains between 40% by weight and 75% by weight of aluminum oxide as component B, between 5% by weight and 25% by weight of aluminum titanate as component A, and between 5% by weight and 25% by weight of boron nitride as an additional component (all percentages are based on the solids content in the composition).

In addition to the components already mentioned, the compositions frequently also comprise further, preferably relatively coarse (with sizes up to the millimeter range or even greater), inorganic particles and/or fibers, especially as fillers.

A composition can be applied to all common metal and nonmetal surfaces. It is suitable, inter alia, for application to objects made of aluminum, titanium, iron, steel, copper, chromium, cast iron, cast steel, and also made of refractory materials and ceramics. It is particularly suitable for application to objects made of silicates, graphite, concrete and boiler steel.

We further provide a layer or coating which is producible especially from a composition, the layer or the coating especially being a mold release layer.

A layer or coating can be produced, for example, by applying a composition to an object and then drying. The application can be effected, for example, by painting or spraying. Subsequently, the dried layer can be consolidated further, which can be done, for example, by a separate thermal treatment (for example heating of the layer to approx. 300° C. to burn out any organic constituents present and then sintering at 700° C.), but quite possibly also "in situ," i.e., by contact with a metal or glass melt at a temperature of several hundred degrees.

The substance composition of the layer corresponds essentially to the above-defined substance composition of the solids content of a composition. In some preferred forms, a layer or coating, however, also comprises a proportion of sialons (silicon aluminum oxynitrides). Sialons can form in the reaction of silicon nitride and aluminum oxide. Sialons exhibit similar properties to silicon nitride, and especially have very low wettability by aluminum or nonferrous metal melts.

In a further preferred form, a layer or coating comprises constituents with thermally insulating action, especially aluminum silicates, calcium silicates and/or mica. Such a form protects, for example, tools, aids and molds not only from adhesions, but also particularly advantageously from the high thermal stresses which can occur especially on contact with liquid metal melts.

A layer or coating preferably has a thickness between 5 μm and 500 μm, preferably between 20 μm and 100 μm.

Our mold release layers are notable especially for a high thermal and chemical stability, and resistance to mechanical stresses, especially for high abrasion stability. In contrast to known mold release layers, our mold release layers are therefore suitable for repeated use (even in the case of lasting stress over several days and weeks).

Our mold release layers which comprise silicon nitride are notable especially for high mechanical stabilities, excellent thermal cycling stability, outstanding wear resistance, good corrosion stability, high thermal shock stability, a high chemical stability and a good thermal conductivity. Owing to the good thermal conductivity, such mold release layers are suitable especially for coating thermocouples or their protective tubes, since the reaction time of the temperature measurement in melts is thus minimized.

The mold release layers which comprise aluminum titanate are notable especially for an excellent thermal shock stability, which has a very positive effect on the stability of the layer. Aluminum titanate-containing coatings are ideally suited for riser tubes in low-pressure casting machines, for metering riser tubes in Strigo and West furnaces, for gating dies for low-pressure casting, for casting dies for DC casting, for filling tubes and break rings.

Metal tubes (for example of stainless steel, chromium-nickel steel or chromium-molybdenum steel) provided with a mold release layer are protected against the adhesion of inorganic slags and melts.

We further also provide objects, especially objects coated with a layer or coating, especially with a mold release layer. It is unimportant whether the object has been coated only partly or else fully with the layer or coating.

The use of a composition for producing a layer or a coating, especially one with thermally insulating properties, preferably a mold release layer, and a process for producing a composition, also form part of the subject matter of this disclosure.

Our processes comprise the dispersion of component A in water and the subsequent mixing of the resulting dispersion with the aqueous dispersions/suspensions of component B, component C and any further components.

Preference is given to dispersing component A by grinding it together with water and at least one polyacrylate in a mill (for example a mortar mill, a ball mill or an annular mill). The further components, especially the nanoscale binder (component C), are preferably not added until thereafter.

Components A, B and C have already been described in detail above. Reference is hereby made to the corresponding points in the description.

Instead of the polyacrylate, further organic assistants which can add onto the surface of the particles to be dispersed are also useful, for example organic acids, carboxamides, β-diketones, oxycarboxylic acids, polyolefins, polyesters, polyacrylates, polymath-acrylates, polyoxyethylene compounds, polyacrylates, polyvinyl alcohols and polyvinyl pyrrolidone (PVP).

Further features are evident from the description of preferred forms which follow. In this case, the individual features can each be realized alone or combined with one another. The particular examples described serve merely for illustration and for better understanding of the disclosure and should in no way be understood to be restrictive.

EXAMPLE 1

4.3 kg of silicon nitride (particle size between 1 μm and 5 μm, from H.C. Starck) are mixed with 4.3 kg of water and 0.1 kg of a polyacrylate (BYK 192, from BYK-Chemie GmbH) and homogenized in a stirred ball mill for 3 hours. In addition to this first mixture, three further mixtures are also made up separately. The second mixture consists of 2.6 kg of an acryloylpolysiloxane (inosil ww from Inomat GmbH) with 11.44 kg of an aqueous suspension of nanoscale zirconium dioxide (at a solids content of 45% by weight and a mean particle size of approx. 10 nm). The third mixture consists of 25.7 kg of aluminum oxide (Almatis, CT 800 SG, mean particle size of approx. 3 µm) dispersed in 38.3 kg of water, and the fourth mixture of 4.3 kg of boron nitride (from Saint-Gobain) dispersed in 6.3 kg of water. The second, third and fourth mixtures are added successively to the first mixture with stirring. This forms a ready-to-use size.

EXAMPLE 2

The size from example 1 is sprayed as a layer onto a sample of refractory concrete. After the sample has been immersed into a light metal melt at 750° C., no damage to the layer is discernible even after 15 days. The solidified cast skin can be removed easily. In a test with a comparable refractory concrete sample without the inventive layer, the light metal melt penetrated into the concrete sample, whose weight consequently tripled.

EXAMPLE 3

The size from example 1 is applied to a stainless steel tube (13CrMo44). The layer thickness is between 40 and 50 µm. After drying and baking, the coated tube piece was exposed to a light metal melt at 750° C. After 5 hours of exposure in the light metal melt, the coating was still undamaged and the solidified cast skin could be removed easily.

EXAMPLE 4

4.3 kg of aluminum titanate (manufacturer: KS-Keramik, mean particle size approx. 15 µm) are mixed with 4.3 kg of water and 0.2 kg of a polyacrylate (BYK 192, from BYK-Chemie GmbH), and homogenized in a stirred ball mill for three hours. In addition to this first mixture, three further mixtures were also made up. The second mixture consists of 2.6 kg of an acryloylpoly-siloxane (inosil ww from Inomat GmbH) with 11.44 kg of an aqueous suspension of nanoscale zirconium dioxide (at a solids content of 45% by weight and a mean particle size of approx. 10 nm). The third mixture consists of 25.7 kg of aluminum oxide (Almatis, CT 800 SG, mean particle size of approx. 3 µm) dispersed in 38.3 kg of water, the fourth mixture of 4.3 kg of boron nitride (from Saint-Gobain) dispersed in 6.3 kg of water. The second, third and fourth mixture are added successively to the first mixture with stirring. This forms a ready-to-use size.

EXAMPLE 5

The size from example 4 is applied to a V2A steel sheet. The layer thickness is between 30 and 40 µm. Even after exposure to a light metal melt at 750° C. for one day, no damage to the layer was discernible. The solidified cast skin could be removed easily.

EXAMPLE 6

The size from example 4 is applied to a sample of refractory concrete and subjected to a long-term exposure test. The layer thickness is between 30 and 40 µm. Even after 30 days of immersion of the sample into a light metal melt at 750° C., no damage to the layer could be seen. The solidified cast skin could be removed easily. The hardness of the layer and its abrasion resistance is excellent. In a test with a comparable refractory concrete sample without the inventive layer, the light metal melt penetrated here too into the concrete sample, whose weight consequently tripled.

EXAMPLE 7

The size from example 4 is applied to a refractory brick made of aluminum silicate and subjected to a long-term exposure test. The layer thickness is between 30 and 40 µm. Even after 30 days of immersion into a light metal melt at 750° C., no damage to the layer could be seen. The solidified cast skin could be removed easily.

EXAMPLE 8

The size from example 4 is applied to a refractory brick made of calcium silicate and subjected to a long-term exposure test. The layer thickness is between 30 and 40 µm. Even after 30 days of immersion into a light metal melt at 750° C., no damage to the layer could be seen. The solidified cast skin could be removed easily.

EXAMPLE 9

The size from example 4 is applied to a sample of graphite and subjected to an exposure test. The layer thickness is between 30 and 40 µm. Even after 5 days of immersion into a light metal melt at 750° C., no damage to the layer could be seen. The solidified cast skin could be removed easily.

EXAMPLE 10

A composition preferred in accordance with the invention has the following components:
- 57.76% by weight of $Al_2O_3$ suspension (solids content 40% by weight),
- 13.10% by weight of $Al_2TiO_5$ (0-140 µm),
- 5.21% by weight of frit mixture of three different glass frits (solids content 50% by weight),
- 17.15% by weight of $ZrO_2$ nanobinder (solids content approx. 44.8% by weight),
- 0.86% by weight of Korantin MAT,
- 2.08% by weight of AMP (2-amino-2-methyl-1-propanol),
- 0.19% by weight of Deuteron XG, and
- 3.65% by weight of Silres MP 42E (solids content 20% by weight).

To prepare the composition, $Al_2O_3$ (A16SG, from Almatis) was dispersed in water with a polyacrylate additive (0-5%) and stirred for a half hour. The resulting suspension was subsequently ground in a bead mill. This adjusted the solids content to 40% by weight.

$Al_2TiO_5$ powder (FC6 $Al_2TiO_5$ from Alroko) with a broad particle size distribution (<140 µm, up to the sub-µm range) was added without dispersion and grinding to the ground aluminum oxide suspension with stirring.

The frit mixture consisting of three different glass frits with a melting range between 600-750° C. was ground wet (solids content 50% by weight) with a bead mill until a particle size of <10 µm had been attained. The frit mixture was subsequently added to the above mixture of Al2O3 suspension and Al2TiO5.

As a nanobinder, base-dispersed $ZrO_2$ (solids content approx. 44.8% by weight, manufacturer: ITN) was subsequently added to the suspension with stirring.

AMP (2-amino-2-methyl-1-propanol), which had been added to the suspension with stirring, was used to adjust its pH to pH 10-11.

Subsequently, Deuteron® XG, an anionic heteropolysaccharide (from Deuteron), Silres® MP42E, an alkyl-modified phenylsilicone resin (from Wacker) and Korantin® MAT, a corrosion inhibitor (from BASF), were added to the suspension with stirring.

On completion of addition of all components, the mixture was stirred overnight, then the size is ready for use and can be applied to mineral or metallic substrates by means of spraying.

EXAMPLE 11

The size from example 10 was applied to a V2A steel sheet. The layer thickness was between 30 and 40 µm. Even after two days of exposure in a light metal melt at 750° C., no damage to the layer was discernible. The solidified cast skin could be removed easily.

The invention claimed is:

1. A composition for producing a mold release layer, comprising aluminum titanate, an oxidic inorganic component, a binder, and a suspension medium, wherein the aluminum titanate comprises particles with a mean particle size of >500 nm, the oxidic inorganic component comprises inorganic oxide particles with a mean particle size between 100 nm and 10 µm and the binder comprises particles having a mean particle size of <50 nm.

2. The composition as claimed in claim 1, comprising:
   A: particles of aluminum titanate with a mean particle size of >500 nm,
   B: inorganic oxide particles with a mean particle size between 100 nm and 10 µm,
   C: a binder which comprises nanoscale particles having a mean particle size of <50 nm, especially less than <25 nm, and
   D: a suspension medium.

3. The composition as claimed in claim 1, comprising:
   A: particles of aluminum titanate with a mean particle size of >1 µm,
   B: inorganic oxide particles with a mean particle size between 200 nm and 10 µm, especially between 200 nm and 1 µm,
   C: a binder which comprises nanoscale particles having a mean particle size of <50 nm, especially less than <25 nm, and
   D: a suspension medium.

4. The composition of claim 2, wherein the particles of component A have a mean particle size between 1 µm and 10 µm.

5. The composition of claim 3, wherein the particles of component A have a mean particle size between 1 µm and 10 µm.

6. The composition of claim 2, wherein the particles of component B have a Mohs hardness of >6.

7. The composition of claim 3, wherein the particles of component B have a Mohs hardness of >6.

8. The composition of claim 2, wherein component B comprises aluminum oxide particles and/or titanium dioxide particles.

9. The composition of claim 3, wherein component B comprises aluminum oxide particles and/or titanium dioxide particles.

10. The composition of claim 1, wherein the nanoscale particles of the binder comprise at least one member selected from the group consisting of aluminum oxide particles, zirconium oxide particles, boehmite particles and titanium dioxide particles.

11. The composition of claim 1, wherein the binder comprises at least one organosilicon constituent from the group consisting of alkylpolysiloxane, alkylsilicone resin and phenylsilicone resin.

12. The composition of claim 1, wherein the binder comprises at least one frit.

13. The composition of claim 1, further comprising as an additional component at least one compound selected from the group consisting of aluminum silicates, calcium silicates and mica.

14. The composition of claim 2, wherein the suspension medium is water as the main constituent.

15. The composition of claim 3, wherein the suspension medium is water as the main constituent.

16. The composition of claim 2, wherein the suspension medium is free of nonaqueous liquid constituents.

17. The composition of claim 3, wherein the suspension medium is free of nonaqueous liquid constituents.

18. The composition of claim 1, further comprising at least one polyacrylate interface-active substance.

19. The composition of claim 1, further comprising boron nitride.

20. The composition of claim 1, further comprising graphite.

21. The composition of claim 1, having a solids content between 25% by weight and 60% by weight.

22. The composition of claim 2, wherein component B is in a proportion of >40% by weight based on the solids content in the composition.

23. The composition of claim 3, wherein component B is in a proportion of >40% by weight based on the solids content in the composition.

24. The composition of claim 2, comprising between 40% by weight and 75% by weight of aluminum oxide as component B, between 5% by weight and 25% by weight of aluminum titanate as component A and between 5% by weight and 25% by weight of boron nitride as an additional component, wherein all percentages are based on the solids content in the composition.

25. The composition of claim 3, comprising between 40% by weight and 75% by weight of aluminum oxide as component B, between 5% by weight and 25% by weight of aluminum titanate as component A and between 5% by weight and 25% by weight of boron nitride as an additional component, wherein all percentages are based on the solids content in the composition.

26. The composition of claim 1, further comprising inorganic particles and/or fibers as fillers.

* * * * *